3,823,201
HIGHLY-STABLE GRAFT COPOLYMER DISPERSIONS IN POLYOLS CONTAINING UNSATURATION AND POLYURETHANES PREPARED THEREFROM

Louis C. Pizzini and Gerhard G. Ramlow, Trenton, and John T. Patton and William W. Levis, Jr., Wyandotte, Mich., assignors to BASF Wyandotte Corporation, Wyandotte, Mich.
No Drawing. Filed Dec. 4, 1972, Ser. No. 311,809
Int. Cl. C08f 13/00, 21/02
U.S. Cl. 260—861                    8 Claims

ABSTRACT OF THE DISCLOSURE

Highly-stable graft copolymer dispersions are prepared by the *in situ* polymerization in the presence of a free radical catalyst of a vinyl monomer in a polyol containing an essential amount of unsaturation. The dispersions are low-viscous liquids which may be advantageously employed in the preparation of flexible urethane foams having enhanced load-bearing properties.

BACKGROUND OF THE INVENTION

1. Field of the Invention

The present invention relates to stable graft copolymer dispersions of low viscosity and superior particle size distribution. More particularly, the invention relates to graft copolymer dispersions prepared by the *in situ* polymerization of a vinyl monomer in a polyol having from 0.10 to 0.70 mole of unsaturation per mole of polyol and to the use of these dispersions in the preparation of polyurethane polymers.

2. Prior Art

Graft copolymer dispersions prepared from vinyl monomers and polyether polyols and the use thereof in the preparation of polyurethane polymers are well known in the art as evidenced by U.S. Pats. Nos. 3,383,351 to Stamberger and 3,652,639 to Pizzini et al. In the earlier patent, the polyols employed are essentially free from ethylenic unsaturation. It is taught that the presence of ethylenic unsaturation promotes crosslinking and an undesired increase in viscosity of the resulting dispersions. One of the major drawbacks of Stamberger is that stable dispersions prepared from many of the common vinyl monomers such as styrene are not able to be prepared when amounts of these monomers are employed sufficient to provide the desired strength properties to polyurethane polymers. Thereafter, it was determined by Pizzini et al. that liquid homogeneous graft copolymers based on acrylonitrile could be prepared by the *in situ* polymerization of acrylonitrile with an unsaturated polyol in the presence of a free radical catalyst. These copolymers are prepared by the simultaneous addition, at a steady rate, of acrylonitrile and the catalyst to the unsaturated polyol. The polyols employed by Pizzini et al. contained at least about one mole of unsaturation per mole of polyol. One drawback of the graft polyols of Pizzini et al. is their relatively high viscosity which appears to be the result of the presence of soluble graft copolymer and/or of graft copolymer of extremely small particle size rather than crosslinking because even very viscous graft polyols of this type are completely soluble in solvents.

SUMMARY OF THE INVENTION

Now in accordance with the present invention graft copolymer dispersions are prepared by the *in situ* polymerization of vinyl monomers in a polyol having from about 0.10 to 0.70 mole of unsaturation per mole of polyol hereinafter also simply referred to as "unsaturated polyol."
In order to obtain the graft copolymer dispersions of the present invention, it is necessary that grafting occurs by the simultaneous addition at a steady rate of a vinyl monomer and a free radical catalyst to the unsaturated polyol at a temperature between 70° C. and 170° C., preferably between 105° C. and 135° C. The dispersions are surprisingly superior to those prepared from essentially saturated polyols in regard to their narrow particle size distribution. They are also surprisingly superior to those prepared from polyols having high unsaturation in regard to their low viscosities. Furthermore, polyurethane foams prepared from these graft copolymers exhibit superior load-bearing properties.

Although not wishing to be bound by theory, it is our belief that the stability of dispersions obtained by the *in situ* polymerization of vinyl monomers in polyols is a result of the formation of surface stabilizing species. Without a stabilizing species which provides a repulsive barrier between the polymer particles, the polymerized material will agglomerate and form irregularly shaped lumps. We have found that the stabilizer is an amphipathic polymer consisting of lyophobic vinyl polymer and lyophilic polyether chains. The vinyl polymer part is absorbed and/or chemically built in the particle surface while the polyether part reaches out in the surrounding polyol phase providing a protective shield against coagulation.

In the case of an *in situ* polymerization in a saturated polyol, such as described in Stamberger, U.S. Pat. No. 3,304,273, an amphiphatic polymer can only be formed via hydrogen abstraction from the polyether chain. If the chain transfer coefficient between polyether and monomer, e.g. styrene, is very low, very little, if any, graft polymer is formed and, therefore, stable dispersions cannot be prepared.

Contrary to the teachings of Stamberger, we have now found that polyols containing ethylenic unsaturation are of definite advantage in the preparation of stable graft copolymer dispersions. If co-reactive unsaturated groups carrying polyether molecules are employed, the surface protective amphipathic species can be formed by copolymerization of the vinyl monomer with these groups. Since, in this case, the co-reaction does not depend on grafting through hydrogen abstraction, more efficient "comb-shaped" structures are obtained, in which the "teeth" are represented by the polyether chains and the "backbone" by the vinyl polymer. Furthermore, stable dispersions can be obtained with monomers which have little tendency to graft, e.g. styrene. As shown in the Examples hereinafter, these dispersions not only exhibit improved shelf-life stability but also they provide improved physical properties to polyurethane foams prepared therefrom.

DESCRIPTION OF THE PREFERRED EMBODIMENTS

The unsaturated polyols employed in the present invention may be prepared by the reaction of any conventional polyol with an organic compound having both ethylenic unsaturation and a hydroxyl, carboxyl, or epoxy group or they may be prepared by employing an organic compound having both ethylenic unsaturation and a hydroxyl, carboxyl, or epoxy group as a reactant in the preparation of the polyol. Representative of such organic compounds include unsaturated polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol, unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxypropylene oxide (allyl glycidylether). If a polycarboxylic acid or anhydride is employed to incorporate unsaturation into the polyols, it is then necessary to react the unsaturated polyol with an alkylene oxide, preferably ethylene or propylene oxide, to replace the carboxyl groups with hydroxyl groups prior to employment in the present invention. The amount of alkylene oxide employed is such to reduce the acid number of the unsaturated polyol to about one or less. Representative polyols which may be employed in the preparation of the unsaturated polyols employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pats. Nos. 1,922,451, 3,190,927 and 3,346,557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha$-$\beta$-diethyl-succinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glucoside, pentaerythritol, and sorbitol. Also included with the term "polyhydric alcohol" are compounds derived from phenol such as 2,2,(4,4'-hydroxyphenyl)propane, commonly known as Bisphenol A.

Any suitable polyalklene polyether polyol may be used such as the polymerization product of an alkylene oxide or of an alkylene oxide with a polyhydric alcohol having from 2 to 6 hydroxyl groups. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene; aliphatic amines such as methyl amine, triisopropanol amine, ethylene diamine, 1,3-propylene diamine, 1,4-butylene diamine, and 1,3-butylene diamine.

As mentioned above, in order to introduce the necessary unsaturated groups into the polyols useful as starting materials in the present invention, the organic compound having both ethylenic unsaturation and a hydroxyl, carboxyl, or epoxy group may be included in the polyol-forming reaction mixture or the unsaturation is introduced by reacting a conventional polyol with said organic compound. To prepare the unsaturated polyols of use in the present invention, from about 0.10 mole to about 0.70 mole, preferably from 0.30 mole to 0.60 mole, of said organic compound per mole of polyol is employed. The preparation of the unsaturated polyols employed in the present invention follows conventional prior art procedures such as disclosed in U.S. Pat. No. 3,275,606 and U.S. Pat. No. 3,280,077. Generally, this requires a reaction at a temperature between 0° C. and 130° C. Both acidic catalysts, such as Lewis acid catalysts and basic catalysts such as alkali metal hydroxides, may be used. In addition, a non-catalyzed reaction may be used employing temperatures between 50° C. and 200° C.

As mentioned above, the graft copolymers of the invention are prepared by the *in situ* polymerization of the above-described unsaturated polyols with an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, $\alpha$-methylstyrene, methylstyrene, 2,4 - dimethylstyrene, ethylstyrene, isopropylstyrene, butylstyrene, phenylstyrene, cyclohexylstyrene, benzylstyrene, and the like; substituted styrenes such as chlorostyrene, 2,5 - dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, 2-ethylhexylacrylate, phenyl acrylate, phenyl methacrylate, α-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinlyoxy diethyl ether, vinyl 2 - ethylmercaptoethyl ether, vinyl methyl ketone, vinyl ethyl ketone, vinyl phosphonates such as bis(β-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t - butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The amount of ethylenically unsaturated monomer employed in the polymerization reaction is generally from 1% to 30%, preferably from 3% to 25%, based on the weight of the unsaturated polyol. The polymerization occurs by simultaneously adding at a steady or constant rate the monomer and a free radical catalyst to the unsaturated polyol at a temperature between about 80° C. and 170° C., preferably from 105° C. to 135° C. Optionally, the catalyst may be dispersed in a portion of the polyol and thereafter added along with the monomer to the remaining portion of the unsaturated polyol.

The concentration of the catalyst is also a critical aspect of the present invention and can vary from about 1% to about 10%, preferably from about 2% to about 5% by weight based on the weight of the monomer. It has been determined that the use of amounts of catalyst less than one percent does not provide for the stable dispersions of the subject invention.

Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, α-methylbenzyl hydroperoxide, α-methyl-α-ethyl benzyl hydroperoxide, Tetralin hydroperoxide, triphenylmethyl hydroperoxide, diphenylmethyl hydroperoxide, α-α - azo-2-methyl butyronitrile, α,α-2-methyl heptonitrile, 1,1'-azo-1-cyclohexane carbonitrile, dimethyl α,α'-azo-isobutyrate, 4,4'-azo-4-cyanopentanoic acid, azobis(isobutyronitrile), persuccinic acid, diisopropyl peroxy dicarbonate, and the like; a mixture of catalysts may also be used. Azobis(isobutyronitrile) is the preferred catalyst.

In a preferred embodiment of the present invention, from 5% to 15% by weight of acrylonitrile and from 5% to 15% by weight of styrene based on the weight of the unsaturated polyol is polymerized in an unsaturated polyol in the presence of from 2% to 4% by weight of azobis(isobutyronitrile) based on the weight of the polyol at a temperature between 110° C. to 140° C. The resulting dispersion contains approximately 20% vinyl polymer, has a viscosity of about 2,500 cps. at 25° C. and imparts exceptional load-bearing properties when employed in the preparation of flexible polyurethane foams. In another preferred embodiment of the invention, from 10% to 20% by weight of styrene is polymerized in an unsaturated polyol as described above. It is only through use of the subject invention that stable dispersions containing at least 10% styrene have been prepared.

In still another preferred embodiment of the present invention, the foregoing graft copolymer dispersions are employed in the preparation of polyurethane compositions, particularly polyurethane foams. The resulting polyurethane products exhibit marked improvements in load-bearing properties and tensile strength without substantial impairment of the other physical properties of the products. The polyurethane products are generally prepared by the reaction of the graft copolymer dispersions with an organic polyisocyanate, optionally in the presence of additional polyhydroxyl-containing components, chain-extending agents, catalysts, surface-active agents, stabilizers, blowing agents, fillers and pigments. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofuromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3' - dimethyldiphenylmethane - 4,4' - diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane - 2,2',5,5' - tetraisocyanate. Especially useful due to their availability and properties are tolylene diisocyanate, diphenylmethane - 4,4' - diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft copolymer dispersions are preferably employed along with another polyhydroxyl-containing component commonly employed in the art. Any of the polyhydroxyl-containing components which are described above for use in the preparation of the graft copolymer dispersions of the present invention may be employed along with the unsaturated polyols in the preparation of the polyurethane compositions of the present invention.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,7,9b - tetraazaphenalene.

Any suitable catalyst may be used including tertiary amines, such as for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Non-ionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane were determined by the following ASTM tests:

Tensile Strength _____ D-412
Modulus _____ D-412
Elongation _____ D-412
Split Tear _____ D-470
Compression Set _____ D-395
Compression Load _____ D-1564

The absorbance of the graft polymer dispersions is measured by the following turbidity test. Turbidity is the cloudiness in a liquid caused by the presence of finely divided suspended material. The quantity of solid material in a colloidal suspension can be determined by measuring either the transmitted light or the scattered light. Absorbance is defined as $\log_{10}$ (1/Transmittance). As turbidity increases, the transmittance decreases and the absorbance increases.

The turbidity method employs a Beckman DU spectrophotometer. The spectrophotometer is operated as per the instructions in the manual using a wavelength of 800 millimicrons, a tungsten lamp, and the red phototube light meter is used. The sample is contained in a curette which is 1 cm. deep and large enough to completely cover the windows in the cell department. The curette is first placed against the window of the phototube housing (right side). The instrument is then adjusted until the sample in this position reads 100% Transmittance. The curette is then moved left against the window of the monochromator housing. The Transmittance scale is then turned until the galvanometer reads zero. The Absorbance is then read off the transmittance scale. The Absorbance=$\log_{10} I_0/I$ where $I_0$ is the intensity of the incident light and $I$ is the intensity of the light remaining after passage through the sample.

EXAMPLE I (A) Preparation of an Unsaturated Polyester-ester Polyol

An autoclave equipped with a thermometer, stirrer, nitrogen source, inlet means and heat exchange means was charged with 49 parts (0.5 mole) of maleic anhydride and 2400 parts (0.5 mole) of a polyol prepared by the reaction of ethylene oxide with a propylene oxide condensate of glycerol, said polyol having an OH number of 35 and containing thirteen weight percent of ethylene oxide. The charge was purged with nitrogen and heated to 150° C. With constant stirring, 132 parts (3.0 moles) of ethylene oxide was added to the charge over a period of two hours maintaining the temperature at 150° C. Upon completion of the oxide addition, the reaction mixture was maintained at 150° C. for seven hours. Thereafter, the reaction mixture was cooled to 25° C. and discharged from the autoclave. The reaction product was stirpped at 100° C. for one hour at less than ten millimeters of mercury to remove volatiles. The product, a clear liquid, had an OH number of 33.6, an acid number of 0.12, a refractive index at 25° C. of 1.4552 and a viscosity at 25° C. of 1875 cps.

(B) Preparation of Graft Copolymer Dispersion

A reaction vessel equipped as described above was charged with a blend of 150 parts of the unsaturated polyol described in (A), above, and 150 parts of the saturated polyol described in (A), above. The amount of unsaturation in the polyol blend was 0.5 mole per mole of polyol. With stirring and under a slight nitrogen flow, the charge was heated to 125° C. and a stream of 100 parts of styrene and of 2.0 parts of azobis(isobutyronitrile) dispersed in 100 parts of the above-described blend was continuously added to the charge over a forty-minute period. Upon completion of the addition, the reaction mixture was maintained at 125° C. for sixty minutes. The reaction mixture was then stripped of volatiles for thirty minutes at 90° C. under less than five milliameters of mercury. The stripped reaction product, a white opaque dispersion, had a viscosity at 25° C. of 4,700 cps. and a hydroxyl number of 27.9.

EXAMPLE II (A) Comparative Example: Use of Polyol Essentially Free From Unsaturation A reaction vessel equipped as described in Example I was charged with 300 parts of the saturated polyol described in Example I. With stirring and under a slight nitrogen flow, the charge was heated to 125° C. and a stream of 100 parts of styrene and of 2.0 parts of azobis (isobutyronitrile) dispersed in 100 parts of the saturated polyol was continuously added to the charge over a forty-minute period. Upon completion of the addition, the reaction mixture was maintained at 125° C. for sixty minutes. The reaction mixture was then stripped of volatiles for thirty minutes at 110° C. at less than ten millimeters of mercury. A completely coagulated mass of polystyrene in polyol was obtained.

(B) Comparative Example: Use of Polyol Containing Large Amounts of Unsaturation

A reaction vessel equipped as described in Example I was charged with 300 parts of the unsaturated polyol described in Example I (unsaturation level of 1.0 mole per mole of polyol). With stirring and under a slight nitrogen flow, the charge was heated to 125° C. and a stream of 100 parts of styrene and of 2.0 parts of azobis(isobutyronitrile) dispersed in 100 parts of the unsaturated polyol was continuously added to the charge over a forty-minute period. Upon completion of the addition, the reaction mixture was maintained at 125° C. for sixty minutes. The reaction mixture was then stripped of volatiles at 120° C. at less than ten millimeters of mercury. The product, a transparent liquid, had a hydroxyl number of 28 and a very high Brookfield viscosity at 25° C. of 19,600 cps.

This example illustrates the differences between the graft copolymers of the subject invention and those of the prior art. Using a polyol essential free from ethylenic unsaturation resulted in a product with a completely coagulated polystyrene while use of a polyol containing a mole of unsaturation per mole of polyol resulted in a liquid product having a viscosity of 20,000 cps. The copolymer of the invention as exemplified by Example I, was a stable white dispersion having a viscosty of 4,700 cps. This copolymer finds particular utility in the preparation of flexible polyurethane foams.

EXAMPLE III

Preparation of Graft Copolymer Dispersions

A reaction vessel equipped as described in Example I was charged with 66 parts of the unsaturated polyol described in Example I and 264 parts of the saturated polyol described in Example I. The polyol blend had an unsaturation of 0.2 mole per mole of polyol. With stirring and under a slight nitrogen flow, the charge was heated to 115° C. and a mixture of 62.5 parts of acrylonitrile and 62.5 parts of styrene and 3.1 parts of azobis(isobutyronitrile) in 170 additional parts of the polyol blend was continuously added to the charge over a period of two hours at 115° C. Upon completion of the addition, the reaction mixture was maintained at 115° C. for one hour. The reaction mixture was then stripped of volatiles for one hour at 100° C. under less than five millimeters of mercury. The stripped reaction product had a Brookfield viscosity of 2900 cps. and a hydroxyl number of 27.1.

The above procedure was duplicated varying the ratio of acrylonitrile to styrene. The polymer dispersions prepared are presented in Table I, below.

TABLE I

| Dispersion | Percent of monomer blend | | Viscosity, cps. at 25° C. | OH number |
|---|---|---|---|---|
| | Styrene | Acrylonitrile | | |
| A | 50 | 50 | 2,900 | 27.1 |
| B | 60 | 40 | 2,730 | 27.6 |
| C | 66 | 33 | 2,490 | 27.8 |
| D | 33 | 66 | 2,410 | 26.9 |

Table I illustrates that the monomer ratio can be changed over a relatively wide range. To the contrary, if a polyol esentially free from ethylenic unsaturation is used, the monomer ratio required for the desired low viscosity is far more limited.

EXAMPLE IV (A) Preparation of an Unsaturated Polyether Polyol

A stainless steel autoclave equipped with a thermometer, stirrer, nitrogen source, inlet means and heat exchange means was charged with 17.6 parts of propylene glycol and 530 parts of a 325 molecular weight polyol prepared by the condensation in the presence of potassium hydroxide of four moles of propylene oxide with one mole of glycerol. The charge was purged with nitrogen and heated to 105° C. With constant stirring, a mixture of 4783.6 parts of propylene oxide and 68.4 parts (corresponding to 0.30 mole per mole of product) of allylglycidylether was gradually added to the reaction mixture over eight hours. Upon completion of the oxide addition, the reaction mixture was maintained at 105° C. for six hours at which time the reaction mixture was cooled to 30° C. and discharged from the autoclave. The reaction product was treated with an adsorbent, filtered to remove the catalyst and stripped at 100° C. for one hour under less than five millimeters of mercury to remove volatiles. The product, a clear colorless liquid, had a hydroxyl number of 59.3, an acid number of 0.01, a refractive index at 25° C. of 1.4509, and a Brookfield viscosity at 25° C. of 480 cps.

(B) Preparation of Dispersion

A reaction vessel equipped as described above was charged with 332 parts of the unsaturated polyol prepared in (A), above. Nitrogen was bubbled through the polyol for about one hour. With stirring and under a slight nitrogen flow, the charge was heated to 115° C. and a mixture of 62.5 parts of acrylonitrile and 62.5 parts of styrene and a solution of 3.6 parts of azobis(isobutyronitrile) in 168 parts of the unsaturated polyol was continuously added to the charge over a period of one hour at 125° C. Upon completion of the addition, the reaction mixture was maintained at 125° C. for twenty minutes. The reaction mixture was then stripped for one hour at 105° C. under less than five millimeters of mercury. The stripped reaction product was a homogeneous liquid dispersion having a Brookfield viscosity at 25° C. of 1772 cps and a hydroxyl number of 48.

EXAMPLE V

A reaction vessel equipped as described in Example I was charged with 332 parts of the unsaturated polyol described in Example IV(A), above. Nitrogen was bubbled through the polyol for about one hour. With stirring and under a slight nitrogen flow, the charge was heated to 115° C. and a stream of 75 parts of acrylonitrile and 50 parts of styrene and a suspension of 2.5 parts of azobis-(isobutyronitrile) in 168 parts of the unsaturated polyol was continuously added to the charge over a period of ninety minutes. Upon completion of the addition, the reaction mixture was maintained at 115° C. for one hour. The reaction mixture was then stripped for twenty minutes at 115° C. under less than ten millimeters of mercury. The stripped reaction product was an off-white liquid having a Brookfield viscosity at 25° C. of 1,300 cps. and a hydroxyl number of 47.

Using a one-quart capacity 3⅜ inch diameter cylindrical container equipped with a Lightnin Model V-7 mixer fitted with a 1¼ inch diameter shrouded mixing blade and operatively connected to a rheostat control set at 140 volts, a suitable quantity of polyol, water, conventional catalysts and silicone surfactant was added to the containers. The mixture was stirred for about thirty seconds, allowed to set for about fifteen seconds and then stirring was resumed. After about sixty seconds elapsed time, the polyisocyanate was added to the container and the resulting mixture was stirred for about four to five seconds. The content of the container was then immediately poured into a cardboard cake box and the foam was allowed to rise therein. After foam rise was completed, the resulting foam was oven cured for about fifteen minutes.

The following table, Table II, sets forth the ingredients and amounts thereof used to prepare the foams, as well as the physical properties of the foams.

TABLE II

| Ingredient: | a | b |
|---|---|---|
| Polyol, parts | a 300 | b 300 |
| Water, parts | 9 | 9 |
| Bis(2,-N,N'dimethylamine-ethyl)ether, ml | 0.33 | 0.33 |
| Silicone surfactant, ml | 3.0 | 3.0 |
| Stannous octoate, ml | 0.7 | 0.7 |
| 80/20 mixture 2,4-, 2,6-toluene diisocyanate, parts | 113 | 119 |
| TDI index | 105 | 105 |
| Physical properties: | | |
| Density, lbs./ft.$^3$ | 1.85 | 1.90 |
| Tensile strength, p.s.i | 19.6 | 13.9 |
| Percent elongation | 130 | 200 |
| Tear, p.i | 2.7 | 2.6 |
| I.L.D.: | | |
| Sample thickness, in | 1.03 | 1.04 |
| Load at 25% deflection | 2.1 | 1.2 |
| Load at 65% deflection | 4.5 | 2.4 |
| Load at 25% return | 1.3 | 0.8 |
| Sag factor | 2.1 | 2.1 |
| Guide factor | 1.2 | 0.6 |
| C.L.D. (p.s.i.): | | |
| Load at 25% deflection | 0.91 | 0.48 |
| Load at 65% deflection | 1.61 | 0.89 |
| Compression sets: | | |
| Percent set at 50% compression | 6.3 | 3.9 |
| Percent set at 90% compression | 6.2 | 4.1 |
| Air flow, c.f.s | 0.35 | 1.15 | a Polyol prepared in Example V, above.
b Polyol prepared by reaction of propylene oxide with glycerine (3,000 molecular weight—OH number of 56).

EXAMPLE VI

A series of graft copolymer dispersions was prepared following the procedure described in Example I. In all cases, (1) a ratio of 10 parts of acrylonitrile to 7.5 parts of styrene was employed; (2) 5.3 weight percent azobis (isobutyronitrile) was employed; (3) a temperature of 125° C. was employed; and (4) the addition of the monomers and the catalyst occurred in about eighty minutes, followed by a sixty-minute reaction period. The only variable in the series was the polyol employed. As a control, an essentially saturated polyol was used. This polyol is the polyol described in Example IV. Unsaturated polyols were then prepared by replacing some of the propylene oxide with allylglycidyl ether. The amount of allylgylcidyl ether was varied to prepare polyols of differing degree of unsaturation. Table III below illustrates graft copolymer dispersions prepared and the physical properties of the dispersions.

TABLE III

| | Polyol | | Graft copolymer dispersion | | |
|---|---|---|---|---|---|
| | Allyl-glycidyl ether, moles | Unsaturation in polyols, meq./gm.* | Viscosity, cps., 25° C. | Absorbance | Percent transmitted |
| A | 0.00 | 0.045 | 2,545 | 1.066 | 8.59 |
| B | 0.30 | 0.105 | 2,420 | 0.426 | 37.5 |
| C | 0.45 | 0.153 | 2,425 | 0.180 | 66.2 |
| D | 0.75 | 0.175 | 2,485 | 0.148 | 71.1 |

*Milliequivalents per gram.

EXAMPLE VII

Following the procedure described in Example I, a series of polyols was prepared with varying levels of unsaturation. The base polyol employed was a 3,000 molecular weight propylene oxide adduct of glycerine (OH number of 56). Maleic anhydride was employed to impart unsaturation to the polyols. A weight ratio of 85:40 acrylonitrile to styrene monomers was employed. All of the polyols were then employed in the preparation of polyurethane foams as described in Example V. The polyols prepared and physical properties thereof, as well as the physical properties of the foams resulting therefrom, are presented in Table IV, below. All foams were prepared using the following ingredients and amounts thereof.

Polyol, grams _____ 300
Water, grams _____ 9.0
Bis(2 N,N'dimethylaminoethyl)ether, ml. _____ 0.33
Silicone surfactant, ml. _____ 3.0
Stannous octoate, ml. _____ 0.72
TDI (80/20-2,4-, 2,6-isomer mixture), Index _____ 105

TABLE IV

| Polyol: | | | | | | | |
|---|---|---|---|---|---|---|---|
| Moles of unsaturation | (g) | (b) | 0.2 | 0.4 | 0.6 | 0.8 | 1.0 |
| Viscosity, cps. at 25° C | 450 | 1,075 | 1,510 | 1,560 | 2,750 | 3,290 | 4,110 |
| Physical properties of foam: | | | | | | | |
| Density, lb./ft.$^3$ | 1.92 | 1.88 | 1.84 | 1.83 | 1.87 | 1.85 | 1.86 |
| Tensile strength, p.s.i | 14.1 | 20.4 | 19.3 | 18.8 | 19.2 | 18.1 | 18.5 |
| Percent elongation | 177 | 133 | 122 | 115 | 105 | 103 | 105 |
| Tear, p.i | 2.6 | 2.5 | 2.5 | 2.3 | 2.5 | 2.4 | 2.3 |
| I.L.D.: | | | | | | | |
| Sample thickness, in | 1.01 | 1.06 | 1.04 | 1.04 | 1.06 | 1.05 | 1.06 |
| Load at 25% deflection | 1.2 | 2.2 | 2.3 | 2.4 | 2.7 | 2.6 | 2.6 |
| Load at 65% deflection | 2.6 | 4.6 | 4.7 | 5.1 | 5.7 | 5.5 | 5.2 |
| Sag factor | 2.15 | 2.08 | 2.03 | 2.10 | 2.13 | 2.09 | 2.03 |
| Guide factor | 0.6 | 1.2 | 1.3 | 1.3 | 1.4 | 1.4 | 1.4 |
| C.L.D.: | | | | | | | |
| Load at 25% deflection | 0.56 | 0.94 | 0.97 | 0.96 | 1.07 | 1.05 | 1.07 |
| Load at 65% deflection | 1.00 | 1.56 | 1.59 | 1.73 | 1.90 | 1.83 | 1.85 | a Polyol employed was propylene oxide adduct of glycerine (OH number of 56), essentially free from unsaturation.
b Polyol employed was propylene oxide adduct of glycerine (OH number of 56), essentially free from unsaturation, in which was polymerized the 85:40 acrylonitrile-styrene monomer mixture.

Table IV illustrates that the use of polyols containing minor amounts of unsaturation positively affects the load-bearing properties of polyurethane foams prepared therefrom. Furthermore, the Table shows that an increase in unsaturation from 0.6 mole to 0.8 mole per mole of polyol does not improve the load-bearing properties of the foams.

EXAMPLE VIII (A) Preparation of an Unsaturated Polyether-ester Diol

A stainless steel autoclave equipped with a thermometer, stirrer, nitrogen source, inlet means and heat exchange means was charged with 123 parts (1.25 moles) of maleic anhydride and 5,000 parts (2.5 moles) of a 2,000 molecular weight polyol prepared by the condensation of propylene oxide with propylene glycol in the presence of potassium hydroxide (OH number of 56.5). The charge was purged with nitrogen and heated to 175° C. With constant stirring, 326 parts (5.62 moles) of propylene oxide was gradually added to the reaction mixture over 0.5 hour. Upon completion of the oxide addition, the reaction mixture was maintained at 175° C. for eleven hours, at which time the reaction mixture was cooled to 30° C. and discharged from the autoclave. The reaction product was stripped at 100° C. for one hour under less than five millimeters of mercury to remove unreacted propylene oxide. The product, a clear golden yellow liquid, had a hydroxyl number of 54.9, an acid number of 0.34, a refractive index at 25° C. of 1.4510 and a Brookfield viscosity at 27° C. of 475 cps.

(B) Preparation of Graft Copolymer Dispersion

A reaction vessel equipped as described above was charged with 350 parts of the unsaturated polyol prepared in (A), above. The vessel was purged with nitrogen and with stirring and under a slight nitrogen flow, the charge was heated to 115° C. and a mixture of 62.5 parts of acrylonitrile and 62.5 parts of styrene and a solution of 2.5 parts of azobis-(isobutyronitrile) in 150 parts of the unsaturated polyol was continuously added to the charge over a period of one hour at 115° C. Upon completion of the addition, the reaction mixture was maintained at 115° C. for twenty minutes. The reaction mixture was then stripped for one hour at 105° C. under less than five millimeters of mercury. The stripped reaction product was a white homogeneous liquid dispersion having a Brookfield viscosity at 25° C. of 1725 cps. and a hydroxyl number of 45.3.

(C) Preparation of Polyurethane Foam

Following the procedure described in Example V, above two polyurethane foams were prepared. The ingredients and amounts thereof, as well as the physical properties of the foams, are presented below.

TABLE V

| Ingredient: | | |
|---|---|---|
| Polyol A, gm | 225 | 225 |
| Polyol B, gm | 75 | |
| Polyol C, gm | | 75 |
| Water, gm | 10.5 | 10.5 |
| Triethylenediamine (30% solution in dipropylene glycol), ml | 1.1 | 1.1 |
| N-ethylmorpholine, ml | 0.5 | 0.5 |
| Silicone surfactant, ml | 2.3 | 2.3 |
| Stannous octoate, ml | 0.25 | 0.25 |
| 80/20 2,4-, 2,6-toluene diisocyanate, gm | 135 | 135 |
| TDI Index | 105 | 105.5 |
| Physical properties: | | |
| Density, lbs./ft.³ | 1.8 | 1.8 |
| Tensile strength, p.s.i | 14.9 | 16.9 |
| Percent elongation | 175 | 161 |
| Tear, p.i | 2.5 | 2.1 |
| I.L.D.: | | |
| Sample thickness, in | 1.05 | 1.05 |
| Load at 25% deflection | 1.25 | 1.55 |
| Load at 65% deflection | 2.65 | 3.15 |
| Load at 25% return | 0.85 | 1.0 |
| Sag factor | 2.10 | 2.04 |
| Grade factor | 0.7 | 0.85 |
| C.L.D. (p.s.i.): | | |
| Load at 25% deflection | 0.54 | 0.66 |
| Load at 85% deflection | 0.92 | 1.06 |
| Compression sets: | | |
| Percent set at 50% compression | 4.7 | 6.4 |
| Percent set at 90% compression | 5.2 | 6.0 |
| Air Flow, c.f.s | 2.36 | 1.39 |

NOTES:
Polyol A = Ethylene oxide capped adduct of 3,000 molecular weight propylene oxide adduct of glycerol (OH number of 56, 10% by weight of ethylene oxide).
Polyol B = 2,000 molecular weight propylene oxide adduct of propylene glycol.
Polyol C = Unsaturated polyol prepared in Example VIII(A), above.

EXAMPLE IX

Preparation of Graft Copolymer Dispersions

A reaction vessel equipped as described in Example I was charged with 66 parts of the unsaturated polyol prepared in Example IV(A). With stirring and under a slight nitrogen flow, the charge was heated to 125° C. and a mixture of 10 parts of bis($\beta$-chloroethyl)vinyl phosphonate and 5 parts of styrene and 0.87 part of azobis(isobutyronitrile) in 19 parts of the polyol blend was continuously added to the charge over a period of one hour at 125° C. Upon completion of the addition, the reaction mixture was maintained at 125° C. for one hour. The reaction mixture was then stripped of volatiles for one hour at 125° C. under less than five millimeters of mercury. The stripped reaction product had a Brookfield viscosity of 1120 cps., a hydroxyl number of 29.5, a phosphorus content of 1.35%, and a chlorine content of 3.4%.

EXAMPLE X (A) Preparation of an Unsaturated Polyether Polyol

A stainless steel autoclave equipped with a thermometer, stirrer, nitrogen source, inlet means and heat exchange means was charged with 20.4 parts of propylene glycol and 292 parts of a 335 molecular weight polyol prepared by the condensation in the presence of potassium hydroxide of four moles of propylene oxide with glycerine. The charge was purged with nitrogen and heated to 105° C. With constant stirring, a mixture of 4579 parts of propylene oxide and 39 parts of allylglycidylether (0.3 mole per mole of polyol) was gradually added to the reaction mixture over 0.5 hour. Upon completion of the oxide addition, the reaction mixture was maintained at 105° C. for eight hours. Thereafter, 870 parts of ethylene oxide was added to the reactor over ninety minutes at a temperature of 105° C. After this addition, the reactor is heated at 105° C. for one hour at which time the reaction mixture was cooled to 30° C. and discharged from the autoclave. The reaction product was treated with an adsorbent, filtered to remove the catalyst and stripped at 100° C. for one hour under less than five millimeters of mercury to remove unreacted propylene oxide. The product, a clear golden yellow liquid, had a hydroxyl number of 33, an acid number of 0.01, a refractive index at 25° C. of 1.4534 and an unsaturation level of 0.105 meq./gm.

(B) Preparation of Graft Copolymer Dispersion

A reaction vessel equipped as described above was charged with 350 parts of the unsaturated polyol prepared in (A), above. Nitrogen was bubbled through the polyol for about one hour. With stirring and under a slight nitrogen flow, the charge was heated to 85° C. and a mixture of 10 parts of glycidyl methacrylate, 95 parts of vinylidine chloride and 20 parts of ethylacrylate and a solution of 1.3 parts of azobis(isobutyronitrile) in 150 parts of the unsaturated polyol was continuously added to the charge over a period of one hour at 85° C. Upon completion of the addition, the reaction mixture was maintained at 85° C. for one hour. The reaction mixture was then stripped for one hour at 85° C. under less than five millimeters of mercury. The stripped reaction product was an opaque liquid dispersion having a Brookfield viscosity at 25° C. of 3250 cps. and a hydroxyl number of 26.1.

EXAMPLE XI

Preparation of Graft Copolymer Dispersion

A reaction vessel equipped as described in Example I was charged with 750 parts of the unsaturated polyol prepared in Example IV(A). Nitrogen was bubbled through the polyol for about one hour. With stirring and under a slight nitrogen flow, the charge was heated to 115° C. and a stream of 250 parts of ethyl hexyl acrylate and a solution of 5.0 parts of azobis(isobutyronitrile) in 250 parts of the unsaturated polyol was continuously added to the charge over a period of three hours at 115° C. Upon completion of the addition, the reaction mixture was maintained at 115° C. for one hour. The reaction mixture was then stripped for one hour at 115° C. under less than five millimeters of mercury. The stripped reaction product was a transparent liquid having a Brookfield viscosity at 25° C. of 950 cps. and a hydroxyl number of 46.2.

EXAMPLE XII (A) Preparation of an Unsaturated Polyol

A reaction vessel equipped as described in Example I was charged with 300 parts (0.1 mole) of a 3,000 molecular weight propylene oxide adduct of glycerine (OH number of 56) and 0.11 part of sodium and heated to 120° C. to 130° C. until the sodium was dissolved. Thereafter the charge was cooled to 85° C. and over a twenty-minute period 14.2 parts (0.1 mole) of glycidyl methacrylate was added thereto with constant stirring. After the addition of the methacrylate, the reaction mixture was heated for thirty minutes at 70° C. with an adsorbent and filtered to remove the catalyst. The product was a slightly brown clear liquid having a hydroxyl number of 55.

15

(B) Preparation of Graft Copolymer Dispersion

Following the procedure described in Example I, a graft copolymer dispersion was prepared from the following ingredients and amounts thereof:

180 parts of the saturated polyol described in (A), above
20 parts of the unsaturated polyol prepared in (A), above
30 parts of styrene
20 parts of acrylonitrile
1 part of azobis(isobutyronitrile)

The resulting white and uniform dispersion had an OH number of 45.5 and a Brookfield viscosity at 25° C. of 2150 cps.

The embodiments of the invention in which an exclusive property or privilege is claimed are defined as follows:

1. A highly stable graft copolymer dispersion prepared by the *in situ* polymerization in the presence of a free radical catalyst at a temperature of from 70° C. to about 170° C. of
   (a) an ethylenically unsaturated monomer or mixture of said monomers in
   (b) an unsaturated polyol mixture containing from 0.10 mole to 0.70 mole of unsaturation per mole of polyol mixture, said polymerization carried out by adding the monomer and the catalyst to the polyol mixture.

2. The copolymer dispersion of claim 1 wherein the monomer is styrene.

3. The copolymer dispersion of claim 1 wherein the monomer is a mixture of acrylonitrile and styrene.

4. The copolymer dispersion of claim 1 wherein the unsaturated polyol mixture comprises a polyol which is prepared by the reaction of an alkylene oxide with the reaction product of maleic anhydride with a polyether polyol having an equivalent weight of from 250 to 5,000.

5. The copolymer dispersion of claim 4 wherein the polyether polyol is an alkylene oxide adduct of glycerol or propylene glycol.

6. The copolymer dispersion of claim 1 wherein the unsaturated polyol mixture is prepared by the reaction of a polyhydric alcohol having from two to six hydroxyl groups with a mixture of propylene oxide and allyl glycidyl ether.

7. The copolymer dispersion of claim 1 wherein the catalyst is azobis(isobutyronitrile).

8. The copolymer dispersion of claim 1 wherein the polyol mixture contains from 0.30 to 0.60 mole of unsaturation per mole of polyol mixture.

References Cited

UNITED STATES PATENTS

| | | | |
|---|---|---|---|
| 3,033,841 | 5/1962 | Germaine | 260—89.1 |
| 3,577,478 | 5/1971 | Thorpe | 260—862 |
| 3,652,639 | 3/1972 | Pizzini et al. | 260—465.4 |

WILLIAM H. SHORT, Primary Examiner

E. A. NIELSEN, Assistant Examiner

U.S. Cl. X.R.

260—33.2 R, 33.4 R, 854, 870, 874, 898